(12) United States Patent
Bae et al.

(10) Patent No.: US 9,598,609 B2
(45) Date of Patent: Mar. 21, 2017

(54) SILOXANE HARD-COATING RESIN COMPOSITION

(71) Applicant: KOREA ADVANCED INSTITUTE OF SCIENCE AND TECHNOLOGY, Daejeon (KR)

(72) Inventors: Byeong-Soo Bae, Daejeon (KR); Ji-Hoon Ko, Daejeon (KR); Gwang-Mun Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/567,703

(22) Filed: Dec. 11, 2014

(65) Prior Publication Data

US 2015/0093585 A1    Apr. 2, 2015

Related U.S. Application Data

(63) Continuation of application No. PCT/KR2013/005208, filed on Jun. 12, 2013.

(30) Foreign Application Priority Data

Jun. 12, 2012 (KR) .......... 10-2012-0062846
Jun. 11, 2013 (KR) .......... 10-2013-0066550

(51) Int. Cl.
| | | |
|---|---|---|
| *C09D 183/06* | (2006.01) | |
| *C08J 7/04* | (2006.01) | |
| *C08G 59/42* | (2006.01) | |
| *C09D 163/00* | (2006.01) | |
| *C08G 77/14* | (2006.01) | |

(52) U.S. Cl.
CPC ........... *C09D 183/06* (2013.01); *C08G 59/42* (2013.01); *C08J 7/047* (2013.01); *C09D 163/00* (2013.01); *C08G 77/14* (2013.01); *C08J 2483/06* (2013.01); *Y10T 428/31663* (2015.04)

(58) Field of Classification Search
CPC ..... C07F 7/182; C08K 5/5419; C08K 5/1545; C08K 5/1515
See application file for complete search history.

(56) References Cited

U.S. PATENT DOCUMENTS

| | | | |
|---|---|---|---|
| 6,090,890 A | 7/2000 | Murakami | |
| 7,329,715 B2 | 2/2008 | Wang et al. | |
| 2009/0269504 A1* | 10/2009 | Liao ............... | C08J 7/047 427/515 |
| 2012/0034450 A1 | 2/2012 | Morita et al. | |

FOREIGN PATENT DOCUMENTS

| | | |
|---|---|---|
| CN | 101068845 | 11/2007 |
| CN | 101213257 | 7/2008 |
| CN | 102419515 | 4/2012 |
| JP | 61-293232 | 12/1986 |
| JP | 2006-063244 | 3/2006 |
| JP | 2007-009080 | 1/2007 |
| JP | 2007-063325 | 3/2007 |
| JP | 2007-217704 | 8/2007 |
| JP | 2011-132416 | 7/2011 |
| KR | 10-2008-0031339 | 4/2008 |
| KR | 10 2011 0129587 | 2/2011 |
| KR | 10 2011 0074677 | * 7/2011 |
| KR | 10 2012 0030012 | 3/2012 |
| KR | 10-1147971 | 5/2012 |
| TW | 200619273 | 6/2006 |
| TW | 201118115 | 8/2011 |
| TW | 201132699 | 10/2011 |
| TW | 201211160 | 3/2012 |
| WO | 2011/084250 | 7/2011 |
| WO | 2012/008498 | 1/2012 |

OTHER PUBLICATIONS

KR 10 2011 0074677 machine translation (2011).*
International Search Report of PCT/KR2013/005208 dated Sep. 23, 2013.
European Search Report, European Patent Office, EP 13804285.8, Oct. 22, 2015.
Office Action, SIPO, CN application No. 201380031082.X, Nov. 16, 2015.

* cited by examiner

*Primary Examiner* — Kuo-Liang Peng
(74) *Attorney, Agent, or Firm* — Lex IP Meitster, PLLC (57) ABSTRACT

The present application relates to a hard-coating resin composition including a siloxane resin, a preparing method of a siloxane cured hard-coating article using same and an optical film including the siloxane cured hard-coating article.

10 Claims, 2 Drawing Sheets

SILOXANE HARD-COATING RESIN COMPOSITION

CROSS-REFERENCE TO RELATED APPLICATION

This application is a continuation of International Patent Application No. PCT/KR2013/005208 filed on Jun. 12, 2013, claiming priority based on Korean Patent Applications No. 10-2012-0062846 filed on Jun. 12, 2012, and No. 10-2013-0066550 filed on Jun. 11, 2013, the contents of all of which are incorporated herein by reference in their entirety.

TECHNICAL FIELD

The embodiments described herein pertain generally to a hard-coating resin composition including a siloxane resin, a preparing method of a siloxane cured hard-coating article using the hard-coating resin composition, and an optical film including the siloxane cured hard-coating article.

BACKGROUND

Transparent plastics have been widely used as a core material in optical and transparent display industries. In particular, transparent plastics such as PC (polycarbonate) or PMMA (polymethyl methacrylate) have been applied in displays, optical lens, transparent boards of large buildings, and automotive industries as a lightweight alternative to conventional glass due to its advantageous properties of high light transmittance, shatter-resistance and high-refractive index. However, these plastic resins have a drawback of low abrasion resistance, since they have lower surface hardness than glass. In order to overcome this drawback, it is rising as an important issue to develop a hard-coating technology for improving the surface hardness of plastics.

Materials used in hard-coating technologies resin are largely divided into organic, inorganic, and organic-inorganic hybrid materials. Organic materials such as acryl, urethane, melamine, etc. have advantages of organic materials such as flexibility and processability, but they have low surface hardness. In contrast, silicon-based inorganic materials have the properties of high surface hardness and transparency, but they have low flexibility and processability. Since hard-coating technology requires the advantages of both of these materials, using an organic-inorganic hybrid material has been attracting more attention than using either one of them. However, even though many studies have been actively made to integrate the benefits of both organic and inorganic materials into the hard-coating technology, they are still unsatisfactory.

In the conventional technologies, Japanese Patent Laid-open Publication No. 2006-063244 discloses a resin composition for hard coating, which is composed of colloidal silica surface-treated with a silane coupling agent having a reactive (meth)acrylate group in its molecule, a monomer having one reactive (meth)acrylate group in its molecule or a polymer prepared by polymerization of this monomer, a bifunctional (meth)acrylate, a tri- or higher multi-functional (meth)acrylate, a leveling agent, and a photo-polymerization initiator. However, photo-radical polymerization of acrylate is sensitive to oxygen, unlike polymerization of alicyclic epoxy group. Thus, when it is intended to obtain a cured hard-coating article using a photo-radical polymerization of acrylate, inert gas atmosphere should be maintained, which is regarded as a disadvantage.

Meanwhile, US Patent Laid-open Publication No. 2012-0034450 discloses a surface protection film, which can be obtained by mixing an ionizing radiation curable resin, a matting agent, an ultraviolet ray absorbing agent, and inorganic fine particles subjected to hydrophobization treatment to thereby prepare a resin, and then curing the resin. However, physical mixing of the ionizing radiation curable resin with the inorganic fine particles may decrease dispersibility and cause aggregation of inorganic fine particles. Transmittance is also decreased due to light scattering caused by the interface between the resin and the inorganic fine particles. Therefore, this film is not suitable for optical protection films.

Accordingly, it is expected that development of hard-coating materials with easy processability of organic materials and high light transmittance and surface hardness of inorganic materials will be an essential technology for a wide range of applications of plastics.

SUMMARY

In view of the foregoing problems, the present disclosure provides a hard-coating resin composition for a hard-coating having easy processability and high surface hardness suitable for a hard-coating agent, in which a siloxane molecule having an inorganic material characteristic is chemically bonded with an alicyclic epoxy group having an organic material characteristic to form one molecule, and the siloxane molecule is made to contain a various molecular weight distribution for dense crosslinking during polymerization of the alicyclic epoxy group in order to obtain high surface hardness due to the inorganic material, unlikely in the conventional technique of physically mixing silica particles in an organic resin. The present disclosure provides a cured hard-coating article using the hard-coating resin composition and an optical film including the cured hard-coating article.

However, the problems sought to be solved by the present disclosure are not limited to the above description and other problems can be clearly understood by those skilled in the art from the following description.

In accordance with a first aspect of the present disclosure, there is provided a hard-coating resin composition, including a siloxane resin including an alicyclic epoxy group, wherein the siloxane resin has a weight-average molecular weight in the range of from about 1,000 to about 4,000 and a molecular weight distribution of PDI ranging from about 1.05 to about 1.4.

In accordance with a second aspect of the present disclosure, there is provided a preparing method of a cured hard-coating article, including a polymerization of the hard-coating resin composition.

In accordance with a third aspect of the present disclosure, there is provided an optical film or sheet including a cured hard-coating article that is prepared by the preparing method of the cured hard-coating article.

In accordance with the present disclosure, it is possible to provide a hard-coating resin composition in which a siloxane molecule having an inorganic material characteristic is chemically bonded with an alicyclic epoxy group having an organic material characteristic, and the siloxane molecule is made to contain a various molecular weight distribution for dense crosslinking during polymerization of the alicyclic epoxy group in order to obtain high surface hardness due to the inorganic material. This hard-coating resin composition has high processability and high surface hardness.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, example embodiments will be described in detail with reference to the accompanying drawings so that inventive concept may be readily implemented by those skilled in the art.

However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Through the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Through the present disclosure, the term "on" that is used to designate a position of one element with respect to another element includes both a case that the one element is adjacent to the another element and a case that any other element exists between these two elements.

Throughout the whole document, the term "comprises" or "includes" and/or "comprising" or "including" used in the document means that one or more other components, steps, operations, and/or the existence or addition of elements are not excluded in addition to the described components, steps, operations and/or elements. The terms "about", "approximately" or "substantially" used in this document are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Through the present disclosure, the term "combinations thereof" included in Markush type description means mixture or combinations thereof one or more components, steps, operations and/or elements selected from the group consisting of components, steps, operation and/or elements described in Markush type and thereby means that the disclosure includes one or more components, steps, operations and/or elements selected from the Markush group.

Throughout the whole document, the description "A and/or B" means "A or B, or A and B."

Through the present disclosure, unless otherwise defined, the term "alkyl" means a straight-chain or branched-chain unsubstituted or substituted saturated hydrocarbon group, and may include methyl, ethyl, propyl, isopropyl, isobutyl, sec-butyl, tert-butyl, pentyl, hexyl, heptyl, octyl, nonyl, decyl, undecyl, tridecyl, pentadecyl and heptadecyl, but may not be limited thereto. Alkyl may include an alkyl group with an alkyl unit having a carbon number ranging from about 1 to about 30, which does not include a carbon number of a substitution product when $C_1$-$C_{30}$ alkyl is substituted.

Through the present disclosure, the term "alkoxy" means an alkyl group, as defined above, bonded to an oxygen atom, and may include a $C_1$-$C_{20}$ alkoxy group. By way of example, the alkoxy may include methoxy, ethoxy, propoxy, butoxy, pentoxy, hexyloxy, heptyloxy, octyloxy, nonyloxy, decyloxy and all of their possible isomers.

The first aspect of example embodiments provides a hard-coating resin composition including a siloxane resin containing an alicyclic epoxy group, wherein the siloxane resin has a weight-average molecular weight in the range of from about 1,000 to about 4,000 and a molecular weight distribution of PDI ranging from about 1.05 to about 1.4.

The siloxane resin containing an alicyclic epoxy group (or an alicyclic epoxy siloxane resin) has a weight-average molecular weight in the range of from about 1,000 to about 4,000 and a molecular weight distribution of PDI ranging from about 1.05 to about 1.4, through condensation reaction of an alkoxysilane alone having an alicyclic epoxy group or between an alkoxysilane having an alicyclic epoxy group with a heterogeneous alkoxysilane. By way of non-limiting example, the weight-average molecular weight of the siloxane resin may be in the range of, e.g., from about 1,000 to about 3,500, from about 1,000 to about 3,000, from about 1,000 to about 2,500, from about 1,000 to about 2,000, from about 1,000 to about 1,500, from about 1,500 to about 4,000, from about 2,000 to about 4,000, from about 2,500 to about 4,000, from about 3,000 to about 4,000, or from about 3,500 to about 4,000. By way of non-limiting example, the siloxane resin may have a molecular weight distribution of PDI ranging, e.g., from about 1.05 to about 1.2 or from about 1.1 to about 1.4.

In accordance with an example embodiment of the present disclosure, the siloxane resin may have a relatively high epoxy equivalent in the range of from about 0.35 to about 0.6 mol/100 g, but may not be limited thereto. Accordingly, the siloxane molecules having various molecular weights are allowed to densely form crosslinking therebetween during photo-polymerization or thermal polymerization of the alicyclic epoxy group. Thus, it is possible to provide a siloxane cured hard-coating article having high hardness, but may not be limited thereto.

Further, owing to the properties of the alicyclic epoxy group, the siloxane resin containing the alicyclic epoxy group of the present disclosure exhibits no oxygen sensitivity upon polymerization, and is photo-curable or thermally curable depending on a polymerization initiator, and, thus, it shows high processability.

Viscosity, curing rate and density of the siloxane resin can be controlled by adding a reactive monomer, such as acid anhydride or oxetane, which reacts with the alicyclic epoxy group to form crosslinking, to the siloxane resin containing the alicyclic epoxy group synthesized by the condensation reaction. Therefore, it is possible to provide an optimal siloxane hard-coating resin composition for the usage of the hard-coating agent.

Therefore, the siloxane hard-coating resin composition of the present disclosure has easy processability of the alicyclic epoxy group, and high surface hardness and transparency through dense crosslinking of the siloxane network due to the siloxane molecules containing various molecular weights.

The siloxane resin in accordance with the present disclosure is prepared by hydrolysis and condensation reaction of an alkoxysilane alone having the alicyclic epoxy group, or between an alkoxysilane having the alicyclic epoxy group with a heterogeneous alkoxysilane in the presence of water.

Hydrolysis and condensation reaction of alkoxysilanes in the presence of water and a catalyst are schematically shown in the following Reaction Schemes 1 to 3:

In Reaction Schemes 1 to 3, R is a straight or branched $C_1$ to $C_7$ alkyl group, and R' may include one or more functional groups selected from the group consisting of a straight or branched $C_1$ to $C_{20}$ alkyl group containing an alicyclic epoxy group, a $C_3$ to $C_3$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group and an alkyd group, but may not be limited thereto.

Reaction Scheme 1 shows formation of a hydroxyl group resulting from hydrolysis of the alkoxy group of the starting material alkoxysilane by water. The formed hydroxyl group forms a siloxane bond through condensation reaction with the hydroxyl group or alkoxy group of another silane, as shown in Reaction Scheme 2 or 3. Thus, by controlling a reaction rate of the reaction, a weight-average molecular weight and a molecular weight distribution (PDI) of the finally formed siloxane compound can be controlled, and a reaction temperature, the amount and kind of a catalyst, a solvent, etc. may be major factors in such control mechanism.

When the alicyclic epoxy siloxane resin having a weight-average molecular weight in the range of from about 1,000 to about 4,000 and a molecular weight distribution of PDI ranging from about 1.05 to about 1.4 is prepared by the above Reaction Schemes, a catalyst is used in order to adjust the reaction rate. The available catalyst may include an acidic catalyst such as hydrochloric acid, acetic acid, hydrogen fluoride, nitric acid, sulfuric acid, chlorosulfonic acid, iodic acid, pyrophosphoric acid and the like; a basic catalyst such as ammonia, potassium hydroxide, sodium hydroxide, barium hydroxide, imidazole and the like; and an ion exchange resin such as Amberite IRA-400, IRA-67 and the like, and may also be selected from the group consisting of combinations thereof. The amount of the catalyst may not be particularly limited. However, the acidic or basic catalyst may be added in an amount of from about 0.0001 to about 0.01 parts by weight with respect to alkoxysilane in an amount of about 100 parts by weight, but may not be limited thereto. The ion exchange resin may be added in an amount of from about 1 to about 10 parts by weight with respect to alkoxysilane in an amount of about 100 parts by weight, but may not be limited thereto.

The hydrolysis and condensation reaction may be performed at a room temperature for from about 12 hours to about 7 days under stirring. In order to facilitate the reaction, however, the hydrolysis and condensation reaction may be performed at a temperature ranging, e.g., from about 60° C. to about 100° C., for from about 2 hours to about 72 hours under stirring.

As shown in Reaction Schemes 1 to 3, when the reactions occur, alcohol and water are generated as byproducts. The alcohol and water are removed to reduce the reverse reaction and to induce the forward reaction, thereby controlling the reaction rate. In addition, when the reactions are terminated, alcohol and water remaining in the siloxane resin may be removed under a reduced pressure at a temperature ranging, e.g., from about 60° C. to about 100° C., for from about 10 minutes to about 60 minutes, but may not be limited thereto.

In accordance with an example embodiment of the present disclosure, the alkoxysilane having the alicyclic epoxy group for the preparation of the alicyclic epoxy siloxane resin may be one or more selected from alkoxysilanes represented by the following Chemical Formula 1 containing an alicyclic epoxy group and an alkoxy group:

$$R^1{}_nSi(OR^2)_{4-n};$$ [Chemical Formula 1]

In Chemical Formula 1, $R^1$ is a straight or branched $C_1$ to $C_6$ alkyl group including an alicyclic epoxy group; the alicyclic epoxy group is a $C_3$ to $C_6$ cycloalkyl group containing an epoxy group; and $R^2$ is a straight or branched $C_1$ to $C_7$ alkyl group, and n is an integer of from 1 to 3.

Examples of the alkoxysilane represented by Chemical formula 1 may include 2-(3,4-epoxycyclohexyl)ethyltrimethoxysilane, 2-(3,4-epoxycyclohexyl)ethyltriethoxysilane or the like, and one or more selected from the group consisting of their combinations may be used, but may not be limited thereto. Further, the alicyclic epoxy siloxane resin may be prepared by using an alkoxysilane alone having the alicyclic epoxy group, or may be prepared through hydrolysis and condensation reaction between an alkoxysilane having the alicyclic epoxy group with a heterogeneous alkoxysilane, but may not be limited thereto. The heteroge- neous alkoxysilane may be one or more selected from alkoxysilanes represented by the following Chemical Formula 2:

[Chemical Formula 2]

In Chemical Formula 2, $R^3$ may include one or more functional groups selected from the group consisting of a $C_1$ to $C_{20}$ alkyl group, a $C_3$ to $C_3$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group and the like. $R^4$ is a straight or branched $C_1$ to $C_7$ alkyl group, and m is an integer of from 0 to 3.

For example, the alkoxysilanes represented by Chemical Formula 2 may be one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, diphenyldimethoxysilane, diphenyldiethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane and the like, but may not be limited thereto.

In accordance with an example embodiment of the present disclosure, in preparing the siloxane hard-coating resin composition, acid anhydride monomer capable of forming crosslinking by reacting with the alicyclic epoxy group may be further added. The acid anhydride group may include at least one acid anhydride monomer represented by the following Chemical Formula 3:

[Chemical Formula 3]

By way of example, the acid anhydride monomer may be one or more selected from the group consisting of phthalic anhydride, tetrahydrophthalic anhydride, hexahydrophthalic anhydride, nadic methyl anhydride, chlorendic anhydride, and pyromellitic dianhydride, but may not be limited thereto.

In accordance with an example embodiment of the present disclosure, in order to provide easy processability by controlling the viscosity of the alicyclic epoxy siloxane resin, a reactive monomer capable of being subjected to photo-polymerization or thermal polymerization may be further added to prepare siloxane hard-coating resin composition. Although the added amount of the reactive monomer may not be particularly limited, it may be to add the reactive monomer in an amount of from about 1 to about 40 parts by weight with respect to the alicyclic epoxy siloxane resin in an amount of about 100 parts by weight. The reactive monomer may be a monomer having an alicyclic epoxy group, or a monomer having an oxetane group, but may not be limited thereto.

By way of example, the monomer having the oxetane group may include at least one oxetane group represented by the following Chemical Formula 4, but may not be limited thereto:

[Chemical Formula 4]

In accordance with an example embodiment of the present disclosure, the oxetane monomer may be one or more selected from the group consisting of 3-methyloxetane, 2-methyloxetane, 3-oxetanol, 2-methyleneoxetane, 3,3-oxetanedimethanethiol, 4-(3-methyloxetane-3-yl)benzonitrile, N-(2,2-dimethylpropyl)-3-methyl-3-oxetanemethanamine, N-(1,2-dimethylbutyl)-3-methyl-3-oxetanemethanamine, (3-ethyloxetane-3-yl)methyl methacrylate, 4-[(3-ethyloxetane-3-yl)methoxy]butan-1-ol, 3-ethyl-3-hydroxymethyloxetane, 2-ethylhexyloxetane, xylylene bisoxetane, and 3-ethyl-3[{(3-ethyloxetane-3-yl)methoxy}methyl]oxetane, but may not be limited thereto.

In accordance with an example embodiment of the present disclosure, the monomer having the alicyclic epoxy group may be one or more selected from the group consisting of 4-vinylcyclohexene dioxide, 4-vinylcyclohexene oxide, (3,4-epoxycyclohexyl)methyl 3,4-epoxycyclohexylcarboxylate, 3,4-epoxycyclohexylmethyl methacrylate, bis(3,4-epoxycyclohexylmethyl)adipate, 3,4-epoxycyclohexancarboxylate, and 2-(3,4-epoxycyclohexyl)-1,3-dioxolane, but may not be limited thereto.

In accordance with an example embodiment of the present disclosure, an initiator for the polymerization of the alicyclic epoxy siloxane resin may be additionally included. By way of non-limiting example, a photo-polymerization initiator such as an onium salt, an organometallic salt or the like, and a thermal polymerization initiator such as an amine, an imidazole, or the like may be used as the initiator. The added amount of the polymerization initiator may not be particularly limited, but it may be to add the polymerization initiator in an amount of from about 0.1 to about 10 parts by weight with respect to the siloxane resin having the alicyclic epoxy group in an amount of about 100 parts by weight, but may not be limited thereto.

By way of example, the photo-polymerization initiator may include one or more selected from the group consisting of an aryl sulfonium hexafluoroantimonate salt, an aryl sulfonium hexafluorophosphate salt, a diphenyliodonium hexafluorophosphate salt, a diphenyliodonium hexafluoroantimonate salt, a ditolyliodonium hexafluorophosphate salt, a 9-(4-hydroxyethoxyphenyl)thianthrenium hexafluorophosphate salt and the like, but may not be limited thereto.

Further, the thermal polymerization initiator may include one or more selected from the group consisting of a 3-methyl-2-butenyltetramethylenesulfonium hexafluoroantimonate salt, an ytterbium (III) trifluoromethenesulfonate salt, a samarium (III) trifluoromethenesulfonate salt, an erbium (III) trifluoromethenesulfonate salt, a dysprosium (III) trifluoromethenesulfonate salt, a lanthanum (III) trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole, 2-ethyl-4-methylimidazole and the like, but may not be limited thereto.

In accordance with an example embodiment of the present disclosure, an organic solvent may be added in order to provide easy processability by controlling the viscosity of the alicyclic epoxy siloxane resin and to control the thickness of a coating film at the same time. The added amount of the organic solvent may not be particularly limited. In case of alcohol, however, the added amount may be in the range of from about 0.1 to about 10 parts by weight with respect to the alicyclic epoxy siloxane resin in an amount of about 100 parts by weight.

The available organic solvent may include one or more selected from the group consisting of ketones such as acetone, methylethylketone, methylbutylketone, methylisobutylketone, cyclohexanone and the like; cellosolves such as methyl cellosolve, ethyl cellosolve, cellosolve acetate, butyl cellosolve and the like; ethers such as ethyl ether, dioxane, tetrahydrofuran and the like; esters such as methyl acetate, ethyl acetate, propyl acetate, isopropyl acetate, butyl acetate, isobutyl acetate, pentyl acetate, isopentyl acetate and the like; alcohols such as butanol, 2-butanol, isobutyl alcohol, isopropyl alcohol and the like; halogenated hydrocarbons such as dichloromethane, chloroform, dichloroethane, trichloroethane, tetrachloroethane, dichloroethylene, trichloroethylene, tetrachloroethylene, chlorobenzene, ortho-dichlorobenzene and the like; hydrocarbons such as n-hexane, cyclohexanol, methylcyclohexanol, benzene, toluene, xylene and the like, but may not be limited thereto.

In accordance with an example embodiment of the present disclosure, the alicyclic epoxy siloxane resin may include an antioxidant in order to prevent oxidation reaction due to the polymerization, but may not be limited thereto. The antioxidant may be a mixture of one or more selected from the group consisting of phenolic antioxidants, phosphite antioxidants, aminic antioxidants, thioester antioxidants or the like, but may not be limited thereto. For example, the phenolic antioxidant may include selected from the group consisting of tetrakis[methylene-3-(3,5-di-tert-butyl-4-hydroxyphenyl)propionate]methane, 1,2-bis(3,5-di-tert-butyl-4-hydroxyhydrocinnamoyl)hydrazine, thiodiethylene bis[3-(3,5-di-tert-butyl-4-hydroxyphenyl)propionate], octadecyl-3-(3,5-di-tert-butyl-4-hydroxyphenyl)propionate, isotridecyl-3-(3,5-di-tert-butyl-4-hydroxyphenyl)propionate, N,N'-hexamethylene bis(3,5-di-tert-butyl-4-hydroxyhydrocinnamamide), benzenepropanoic acid, 3,5-bis(1,1-dimethylethyl)-4-hydroxy-2,2'-ethylidene bis(4,6-di-tert-butyl phenol), 1,3,5-trimethyl-2,4,6-tris(3,5-di-tert-butyl-4-hydroxybenzyl)benzene, 4,6-bis(octylthiomethyl)-o-cresol, 1,3,5-tris(2,6-dimethyl-3-hydroxy-4-tert-butylbenzyl)isocyanurate, 2,2'-methylene bis(4-methyl-6-tert-butylphenol), triethylene glycol-bis-3-(3-tert-butyl-4-hydroxy-5-methyl phenyl)propionate, 2,5-di-tert-amyl-hydroquinone, hexamethylene bis[3-(3,5-di-tert-butyl-4-hydroxyphenyl)propionate], tris-(3,5-di-tert-butylhydroxybenzyl)isocyanurate, 4,4'-thiobis(6-tert-butyl-m-cresol), 4,4'-butylidene bis(6-tert-butyl-3-methylphenol) and combinations thereof. The phosphite antioxidant may include selected from the group consisting of tris(2,4-di-tert-butylphenyl)phosphite, distearyl pentaerythritol diphosphite, bis(2,4-di-tert-butylphenyl)pentaerythritol diphosphite, triphenyl phosphite, triisodecyl phosphite, diphenylisodecyl phosphite, 2-ethylhexyl diphenyl phosphite, poly(dipropylene glycol) phenyl phosphite, tris(nonylphenyl)phosphite and combinations thereof, the aminic antioxidant may include 2,2,4-trimethyl-1,2-dihydroquinoline oligomer, the thioester antioxidant may include selected from the group consisting of pentaerythritol tetrakis(3-laurylthiopropionate), distearyl thiodipropionate, dilauryl thiodipropionate, ditridecyl thiodipropionate and combinations thereof, but may not be limited thereto. Although the addition amount of the antioxidant may not be particularly limited, it may be to add it in an amount of from about 0.1 to about 10 parts by weight with respect to the alicyclic epoxy siloxane resin of about 100 parts by weight.

In accordance with an example embodiment of the present disclosure, the hard-coating resin composition may further include a leveling agent or a flow control agent, but may not be limited thereto.

In accordance with a second aspect of the present disclosure, there is provided a preparing method of a cured hard-coating article, including a polymerization of the hard-coating resin composition.

In accordance with an example embodiment of the present disclosure, the polymerization may include a step of irradiating light or heating, but may not be limited thereto.

In accordance with an example embodiment of the present disclosure, after coating, casting, and molding steps of the alicyclic epoxy siloxane resin composition, photo-polymerization or thermal polymerization may be performed to prepare a siloxane cured hard-coating article having high surface hardness. In the photo-polymerization, thermal treatment may be performed after irradiating light to obtain homogeneous curing density, and the thermal treatment may be performed at a temperature ranging from about 50° C. or more to about 250° C. or less inclusive, but may not be limited thereto. Further, the thermal polymerization may be performed at a temperature ranging from about 50° C. or more to about 250° C. or less inclusive, but may not be limited thereto. The thermal treatment temperature may vary depending on process conditions for the siloxane cured hard-coating article. If the thermal treatment temperature is higher than about 250° C., bonding chains between organic functional groups may be broken. If the thermal treatment temperature is lower than about 50° C., the polymerization may not be performed sufficiently.

In accordance with a third aspect of the present disclosure, there is provided an optical film or sheet including the cured hard-coating article which is prepared by polymerization of the hard-coating resin composition.

Hereinafter, example embodiments are described in more detail by using Examples, but the present disclosure may not be limited to the Examples.

EXAMPLES

Figure 1:
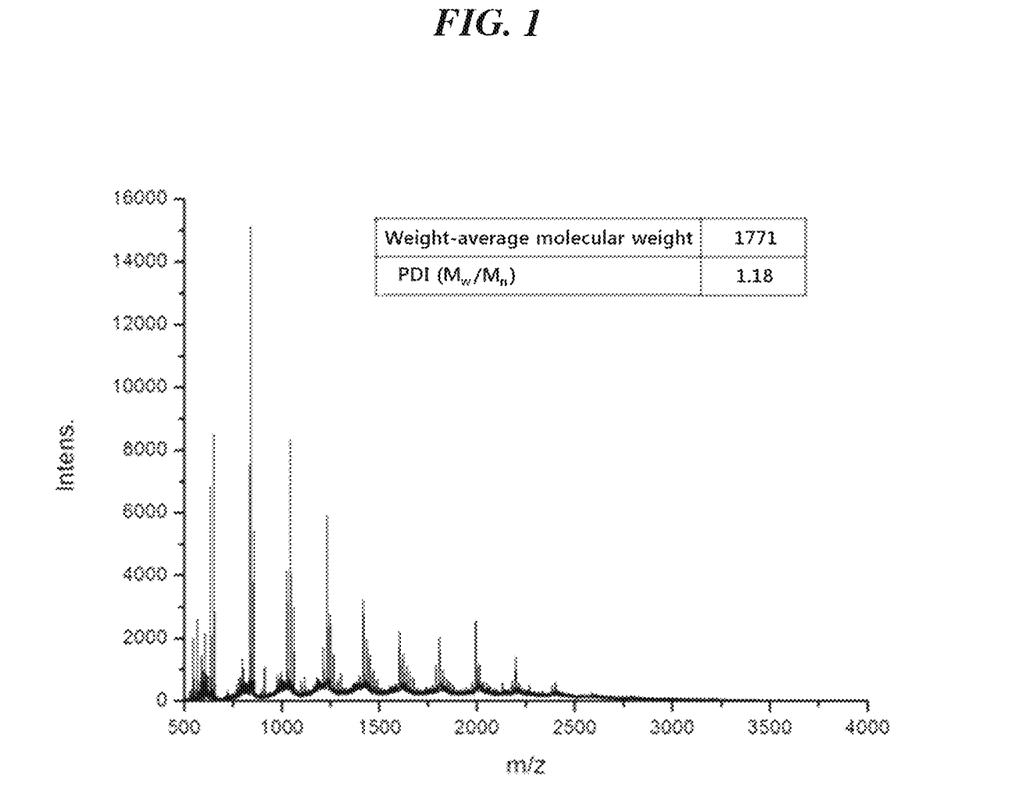
FIG. 1 is a graph showing molecular weights of siloxane resins including an alicyclic epoxy group according to an example of the present disclosure, which was obtained by using a Matrix-Assisted Laser Desorption Ionization Mass Spectrometer.
Figure 2:
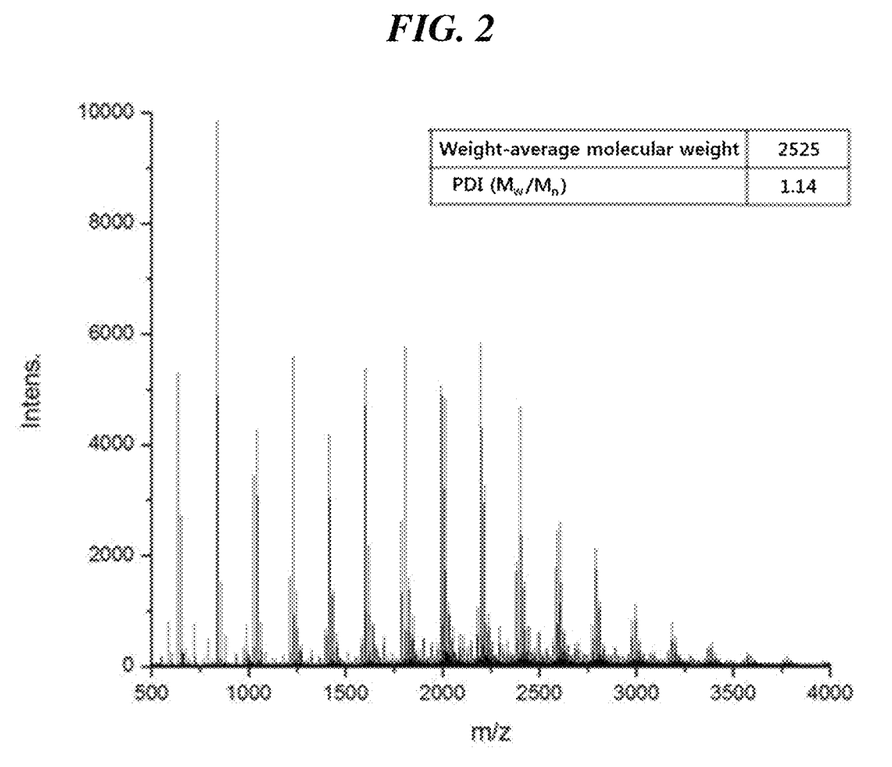
FIG. 2 is a graph showing molecular weights of siloxane resins including an alicyclic epoxy group according to an example of the present disclosure, which was obtained by using a Matrix-Assisted Laser Desorption Ionization Mass Spectrometer.

In order to measure a molecular weight of a siloxane resin containing an alicyclic epoxy group in accordance with the following examples, a matrix-assisted laser desorption ionization mass spectrometer was used, and the measurement results are provided in FIGS. 1 and 2. An epoxy equivalent (mol/100 g) of the siloxane resin was measured according to JIS K7236.

Further, in order to facilitate coating of siloxane resin compositions obtained in the following examples and improve processability, methylethylketone was added as an organic solvent. Further, In order to measure the surface hardness of siloxane cured hard-coating articles obtained in the following examples, a pencil hardness tester according to JIS K5600 was used.

Example 1

Photo-Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into an about 100 mL of 2-neck flask. Thereafter, 0.05 mL of ammonia as a catalyst was added to the mixture, and stirred at 60° C. for 6 hours. The mixture was filtered using a 0.45 µm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and the measured value is shown in the following FIG. 1. By using this measured value, it was confirmed that the alicyclic epoxy siloxane resin has a number average molecular weight of 1,498, a weight-average molecular weight of 1,771, and a PDI ($M_w/M_n$) of 1.18.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 µm, 40 µm, and 60 µm, and then exposed to a UV lamp having a wavelength of 365 nm for 1 minute for photo-curing. After photo-curing was completely finished, thermal treatment was performed at a temperature of 80° C. for 1 hour, thereby producing a siloxane cured hard-coating article.

Example 2

Photo-Polymerization 2-(3,4-epoxycyclohexyl)ethyltrimethoxysilane (ECTMS, Gelest) and water ($H_2O$, Sigma-Aldrich) were mixed in a ratio of 24.64 g:2.70 g (0.1 mol:0.15 mol), and then put into an about 100 mL of 2-neck flask. Thereafter, 0.05 mL of ammonia as a catalyst was added to the mixture, and stirred at 60° C. for 6 hours. The mixture was filtered using a 0.45 µm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 1. By using this measured value, it was confirmed that the alicyclic epoxy siloxane resin has a number average molecular weight of 1,498, a weight-average molecular weight of 1,771, and a PDI ($M_w/M_n$) of 1.18.

Next, 3-ethyl-3[{(3-ethyloxetane-3-yl)methoxy}methyl]oxetane as a photo-polymerizable reactive monomer was added in an amount of 20 parts by weight with respect to the resin, and an aryl sulfonium hexafluoroantimonate salt as a polymerization initiator for photo-polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resulting resin, thereby obtaining a siloxane hard-coating resin composition.

The siloxane hard-coating resin composition was coated on the surface of PET in different thicknesses of 20 µm, 40 µm, and 60 µm, and then exposed to a UV lamp having a wavelength of 365 nm for 1 minute for photo-curing. After photo-curing was completely finished, thermal treatment was performed at a temperature of 80° C. for 1 hour, so that a siloxane cured hard-coating article was produced.

Example 3

Thermal Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into an about 100 mL of 2-neck flask. Thereafter, 0.05 mL of ammonia as a catalyst was added to the mixture, and stirred at 60° C. for 6 hours. The mixture was filtered using a 0.45 µm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 1. By using this measured value, it was confirmed that the alicyclic epoxy siloxane resin has a number average molecular weight of 1,498, a weight-average molecular weight of 1,771, and a PDI ($M_w/M_n$) of 1.18.

Next, 4-methyl-1,2-cyclohexene dicarboxylic anhydride as a thermal polymerizable reactive monomer was added in an amount of 90 parts by weight with respect to the obtained resin, and 2-ethyl-4-methylimidazole as a polymerization initiator for thermal polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 µm, 40 µm, and 60 µm, and thermal treatment was performed at a temperature of 80° C. for 3 hours, thereby producing a siloxane cured hard-coating article.

Example 4

Photo-Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into an about 100 mL of 2-neck flask. Thereafter, 6.1 g of Amberite IRA-400 as a catalyst was added to the mixture, and stirred at 60° C. for 24 hours. The mixture was filtered using a 0.45 µm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 2. By using this measured value, it was confirmed that the alicyclic epoxy siloxane resin has a number average molecular weight of 2,217, a weight-average molecular weight of 2,525, and a PDI ($M_w/M_n$) of 1.14.

Next, an aryl sulfonium hexafluoroantimonate salt as a polymerization initiator for photo-polymerization was added in an amount of 2 parts by weight with respect to the resin.

Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was applied onto the surface of PET in different thicknesses of 20 μm, 40 μm, and 60 μm, and then exposed to a UV lamp having a wavelength of 365 nm for 1 minute for photo-curing. After photo-curing was completely finished, thermal treatment was performed at a temperature of 80° C. for 1 hour, thereby producing a siloxane cured hard-coating article.

Example 5

Photo-Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into an about 100 mL of 2-neck flask. Thereafter, 6.1 g of Amberite IRA-400 as a catalyst was added to the mixture, and stirred at 60° C. for 24 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 2. By using this measured value, it was confirmed that the alicyclic epoxy siloxane resin has a number average molecular weight of 2,217, a weight-average molecular weight of 2,525, and a PDI ($M_w/M_n$) of 1.14.

Next, 3-ethyl-3[{(3-ethyloxetane-3-yl)methoxy}methyl]oxetane as a photo-polymerizable reactive monomer was added in an amount of 20 parts by weight with respect to the resin, and an aryl sulfonium hexafluoroantimonate salt as a polymerization initiator for photo-polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 μm, 40 μm, and 60 μm, and then exposed to a UV lamp having a wavelength of 365 nm for 1 minute for photo-curing. After photo-curing was completely finished, thermal treatment was performed at a temperature of 80° C. for 1 hour, thereby producing a siloxane cured hard-coating article.

Example 6

Thermal Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into an about 100 mL of 2-neck flask. Thereafter, 6.1 g of Amberite IRA-400 as a catalyst was added to the mixture, and stirred at 60° C. for 24 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 2. By using this measured value, it was confirmed that the alicyclic epoxy siloxane resin has a number average molecular weight of 2,217, a weight-average molecular weight of 2,525, and a PDI ($M_w/M_n$) of 1.14.

Next, 4-methyl-1,2-cyclohexenedicarboxylic anhydride as a thermal polymerizable reactive monomer was added in an amount of 90 parts by weight, with respect to the resin, and 2-ethyl-4-methylimidazole as a polymerization initiator for thermal polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated onto the surface of PET in different thicknesses of 20 μm, 40 μm, and 60 μm, and then thermal treatment was performed at a temperature of 80° C. for 3 hours, thereby producing a siloxane cured hard-coating article.

Example 7

Photo-Polymerization 2-(3,4-epoxycyclohexyl)ethyltrimethoxysilane (ECTMS, Gelest) and phenyltrimethoxysilane (PTMS, Gelest) were mixed at a ratio of 23.41 g:0.99 g (0.95 mol:0.05 mol), and 2.70 g (0.15 mol with respect to 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,392, a weight-average molecular weight of 1,758, and a PDI ($M_w/M_n$) of 1.26.

Next, 3-ethyl-3[{(3-ethyloxetane-3-yl)methoxy}methyl]oxetane as a photo-polymerizable reactive monomer was added in an amount of 20 parts by weight with respect to the resin, and an aryl sulfonium hexafluoroantimonate salt as a polymerization initiator for photo-polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 μm, 40 μm, and 60 μm, and then exposed to a UV lamp having a wavelength of 365 nm for 1 minute for photo-curing. After photo-curing was completely finished, thermal treatment was performed at a temperature of 80° C. for 1 hour, thereby producing a siloxane cured hard-coating article.

Example 8

Thermal Polymerization 2-(3,4-epoxycyclohexyl)ethyltrimethoxysilane (ECTMS, Gelest) and phenyltrimethoxysilane (PTMS, Gelest) were mixed at a ratio of 23.41 g:0.99 g (0.95 mol:0.05 mol), and 2.70 g (0.15 mol based on 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,392, a weight-average molecular weight of 1,758, and a PDI ($M_w/M_n$) of 1.26.

Next, 4-methyl-1,2-cyclohexenedicarboxylic anhydride as a thermal polymerizable monomer was added in an amount of 90 parts by weight with respect to the resin, and 2-ethyl-4-methylimidazole as a polymerization initiator for thermal polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 μm, 40 μm, and 60 μm, and then thermal treatment was performed at a temperature of 80° C. for 3 hours, so that a siloxane cured hard-coating article was produced.

Example 9

Photo-Polymerization 2-(3,4-epoxycyclohexyl)ethyltrimethoxysilane (ECTMS, Gelest) and (heptadecafluoro-1,1,2,2-tetrahydrodecyl) trimethoxysilane (PEAS, Gelest) were mixed at a ratio of 24.15 g:1.14 g (0.98 mol:0.02 mol), and 2.70 g (0.15 mol based on 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,979, a weight-average molecular weight of 2,507, and a PDI ($M_w/M_n$) of 1.27.

Next, 3-ethyl-3[{(3-ethyloxetane-3-yl)methoxy}methyl] oxetane as a photo-polymerizable reactive monomer was added in an amount of 20 parts by weight with respect to the resin, and an aryl sulfonium hexafluoroantimonate salt as a polymerization initiator for photo-polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 μm, 40 μm, and 60 μm, and then exposed to a UV lamp having a wavelength of 365 nm for 1 minute for photo-curing. After photo-curing was completely finished, thermal treatment was performed at a temperature of 80° C. for 1 hour, so that a siloxane cured hard-coating article was produced.

Example 10

Thermal Polymerization 2-(3,4-epoxycyclohexyl)ethyltrimethoxysilane (ECTMS, Gelest) and (heptadecafluoro-1,1,2,2-tetrahydrodecyl) trimethoxysilane (PEAS, Gelest) were mixed at a ratio of 24.15 g:1.14 g (0.98 mol:0.02 mol), and 2.70 g (0.15 mol based on 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,979, a weight-average molecular weight of 2,507, and a PDI ($M_w/M_n$) of 1.27.

Next, 4-methyl-1,2-cyclohexenedicarboxylic anhydride as a thermal polymerizable reactive monomer was added in an amount of 90 parts by weight with respect to the resin, and 2-ethyl-4-methylimidazole as a polymerization initiator for thermal polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was applied onto the surface of PET in different thicknesses of 20 μm, 40 μm, and 60 μm, and then thermal treatment was performed at a temperature of 80° C. for 3 hours, so that a siloxane cured hard-coating article was produced.

Example 11

Photo-Polymerization 2-(3,4-epoxycyclohexyl)ethyltrimethoxysilane (ECTMS, Gelest) and 3-(meth)acryloxypropyltrimethoxysilane (MPTS, Gelest) were mixed at a ratio of 23.41 g:1.24 g (0.95 mol:0.05 mol), and 2.70 g (0.15 mol based on 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,563, a weight-average molecular weight of 2,014, and a PDI ($M_w/M_n$) of 1.29.

Next, 3-ethyl-3[{(3-ethyloxetane-3-yl)methoxy}methyl]oxetane as a photo-polymerizable monomer was added in an amount of 20 parts by weight with respect to the resin, and an aryl sulfonium hexafluoroantimonate salt as a polymerization initiator for photo-polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in different thicknesses of 20 μm, 40 μm, and 60 μm, and then exposed to a UV lamp having a wavelength of 365 nm for 1 minute for photo-curing. After photo-curing was completely finished, thermal treatment was performed at a temperature of 80° C. for 1 hour, so that a siloxane cured hard-coating article was produced.

Example 12

Thermal Polymerization 2-(3,4-epoxycyclohexyl)ethyltrimethoxysilane (ECTMS, Gelest) and 3-(meth)acryloxypropyltrimethoxysilane (MPTS, Gelest) were mixed at a ratio of 23.41 g:1.24 g (0.95 mol:0.05 mol), and 2.70 g (0.15 mol based on 0.1 mol of total silane) of water (H$_2$O, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 1,563, a weight-average molecular weight of 2,014, and a PDI ($M_w/M_n$) of 1.29.

Next, 4-methyl-1,2-cyclohexenedicarboxylic anhydride as a thermal polymerizable monomer was added in an amount of 90 parts by weight with respect to the resin, and 2-ethyl-4-methylimidazole as a polymerization initiator for thermal polymerization was added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated onto the surface of PET in different thickness of 20 μm, 40 μm, and 60 μm, and then thermal treatment was performed at a temperature of 80° C. for 3 hours, so that a siloxane cured hard-coating article was produced.

Comparative Example 1

The siloxane resin in accordance with the present disclosure is composed of siloxane molecules having a molecular weight distribution of PDI ranging from 1.05 to 1.4. The siloxane molecular having various sizes are densely cross-linked, thus making it possible to provide a siloxane cured hard-coating article having high hardness. In order to investigate the effect of the molecular weight distribution in such a wide range, Comparative Example 1 was conducted.

In order to obtain a cured article by polymerizing PC-1000 (Polyset Company) which is a siloxane resin containing an alicyclic epoxy group represented by the following Chemical Formula 5. An aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a resin composition.

[Chemical Formula 5]

The resin composition was coated on the surface of PET in different thicknesses of 20 μm, 40 μm, and 60 μm, and then exposed to a UV lamp having a wavelength of 365 nm for 1 minute for photo-curing. After photo-curing was completed, thermal treatment was performed at a temperature of 80° C. for 1 hour, so that a cured article was produced.

The weight-average molecular weights and the PDI values of the alicyclic epoxy siloxane resins obtained in the above Examples are provided in the following Table 1.

TABLE 1

| Example No. | Weight-Average Molecular Weight | PDI |
| --- | --- | --- |
| 1, 2, 3 | 1,771 | 1.18 |
| 4, 5, 6 | 2,525 | 1.14 |
| 7, 8 | 1,758 | 1.26 |
| 9, 10 | 2,507 | 1.27 |
| 11, 12 | 2,014 | 1.29 |

In order to measure the surface hardness of the siloxane cured hard-coating articles obtained in the examples and the comparative example, a pencil hardness tester according to JIS K-5600 was used, and the results are shown in the following Table 2.

TABLE 2

| | Thickness of Coating Film on PET | | |
| --- | --- | --- | --- |
| | 20 μm | 40 μm | 60 μm |
| Example 1 | 8H | 9H | 9H |
| Example 2 | 8H | 8H | 9H |
| Example 3 | 3H | 4H | 4H |
| Example 4 | 8H | 9H | 9H |
| Example 5 | 8H | 8H | 9H |
| Example 6 | 3H | 4H | 4H |
| Example 7 | 8H | 8H | 9H |
| Example 8 | 3H | 4H | 4H |
| Example 9 | 7H | 8H | 9H |
| Example 10 | 3H | 3H | 4H |

TABLE 2-continued

|  | Thickness of Coating Film on PET | | |
|---|---|---|---|
|  | 20 μm | 40 μm | 60 μm |
| Example 11 | 7H | 8H | 9H |
| Example 12 | 3H | 3H | 4H |
| Comparative Example 1 | 1H or less | 1H or less | 1H or less |

As shown in Table 2, as compared to the PC-1000 of the Comparative Example 1 having a single molecular weight, the siloxane resin of the present disclosure has a various molecular weight distribution of PDI in the range of from 1.05 to 1.4. Accordingly, at the time of polymerization, the siloxane molecules may be densely cross-linked to each other, thereby providing a siloxane cured hard-coating article having high hardness. Further, due to its easy processability, the siloxane resin of the present disclosure is suitable for being used as a hard-coating agent.

The siloxane resin in accordance with the present disclosure is also characterized in that its epoxy equivalent is in the range, e.g., from 0.35 to 0.6 mol/100 g. In order to investigate the effect of the epoxy equivalent in such a range, the following Examples were implemented.

Example 13

2-(3,4-epoxycyclohexyl)ethyltrimethoxysilane (ECTMS, Gelest) and phenyltrimethoxysilane (PTMS, Gelest) were mixed at a ratio of 22.17 g:1.98 g (0.90 mol:0.10 mol), and 2.70 g (0.15 mol with respect to 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 2,181, a weight-average molecular weight of 2,382, a PDI ($M_w/M_n$) of 1.09, and an epoxy equivalent of 0.52 mol/100 g.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl) propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in a thickness of 40 μm, and then exposed to a UV lamp having a wavelength of 365 nm for 1 minute for photo-curing. After photo-curing was completed, thermal treatment was performed at a temperature of 80° C. for 1 hour, so that a siloxane cured hard-coating article was obtained.

Example 14

2-(3,4-epoxycyclohexyl)ethyltrimethoxysilane (ECTMS, Gelest) and phenyltrimethoxysilane (PTMS, Gelest) were mixed at a ratio of 19.71 g:3.97 g (0.80 mol:0.20 mol), and 2.70 g (0.15 mol with respect to 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 2,193, a weight-average molecular weight of 2,435, a PDI ($M_w/M_n$) of 1.11, and an epoxy equivalent of 0.48 mol/100 g.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl) propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of PET in a thickness of 40 μm, and then exposed to a UV lamp having a wavelength of 365 nm for 1 minute for photo-curing. After photo-curing was completed, thermal treatment was performed at a temperature of 80° C. for 1 hour, so that a siloxane cured hard-coating article was obtained.

Example 15

2-(3,4-epoxycyclohexyl)ethyltrimethoxysilane (ECTMS, Gelest) and phenyltrimethoxysilane (PTMS, Gelest) were mixed at a ratio of 17.25 g:5.95 g (0.70 mol:0.30 mol), and 2.70 g (0.15 mol with respect to 0.1 mol of total silane) of water ($H_2O$, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 2,238, a weight-average molecular weight of 2,460, a PDI ($M_w/M_n$) of 1.10, and an epoxy equivalent of 0.43 mol/100 g.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl) propionate and tris(nonylphenyl)phosphite of were added to the resin in amounts of 1.35 parts by weight and 3.6 parts by weight, respectively, with respect to the resin, thereby obtaining a siloxane hard-coating resin composition.

The siloxane hard-coating resin composition was coated on the surface of PET in a thickness of 40 μm, and then exposed to a UV lamp with a wavelength of 365 nm for 1 minute for photo-curing. After photo-curing was completed, thermal treatment was performed at a temperature of 80° C. for 1 hour, so that a siloxane cured hard-coating article was obtained.

Example 16

2-(3,4-epoxycyclohexyl)ethyltrimethoxysilane (ECTMS, Gelest) and phenyltrimethoxysilane (PTMS, Gelest) were mixed at a ratio of 14.78 g:7.93 g (0.60 mol:0.40 mol), and 2.70 g (0.15 mol with respect to 0.1 mol of total silane) of water (H$_2$O, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 2,224, a weight-average molecular weight of 2,469, a PDI (M$_w$/M$_n$) of 1.11, and an epoxy equivalent of 0.38 mol/100 g.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl) propionate and tris(nonylphenyl)phosphite of were added in amounts of 1.35 parts by weight and 3.6 parts by weight, respectively, with respect to the resin, thereby obtaining a siloxane hard-coating resin composition.

The siloxane hard-coating resin composition was coated on the surface of PET in a thickness of 40 μm, and then exposed to a UV lamp with a wavelength of 365 nm for 1 minute for photo-curing. After photo-curing was completed, thermal treatment was performed at a temperature of 80° C. for 1 hour, so that a siloxane cured hard-coating article was obtained.

Comparative Example 2

2-(3,4-epoxycyclohexyl)ethyltrimethoxysilane (ECTMS, Gelest) and phenyltrimethoxysilane (PTMS, Gelest) were mixed at a ratio of 12.32 g:9.92 g (0.50 mol:0.50 mol), and 2.70 g (0.15 mol with respect to 0.1 mol of total silane) of water (H$_2$O, Sigma-Aldrich) was added thereto, and then the mixture was put into an about 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer. By using this measured value, it was confirmed that the alicyclic epoxy siloxane resin has a number average molecular weight of 2,134, a weight-average molecular weight of 2,379, a PDI (M$_w$/M$_n$) of 1.11, and an epoxy equivalent of 0.33 mol/100 g.

Next, an aryl sulfonium hexafluoroantimonate salt as a polymerization initiator for photo-polymerization was added in an amount of 2 parts by weight with respect to the resin. Then, as antioxidants to prevent oxidation due to the polymerization, iso-octyl-3-(3,5-di-tert-butyl-4-hydroxyphenyl) propionate and tris(nonylphenyl)phosphite of were added in amounts of 1.35 parts by weight and 3.6 parts by weight, respectively, with respect to the resin, thereby obtaining a siloxane hard-coating resin composition.

The siloxane hard-coating resin composition was coated on the surface of PET in a thickness of 40 μm, and then exposed to a UV lamp with a wavelength of 365 nm for 1 minute for photo-curing. After photo-curing was completed, thermal treatment was performed at a temperature of 80° C. for 1 hour, so that a siloxane cured hard-coating article was obtained.

The weight-average molecular weights, the PDI values and the epoxy equivalent of the alicyclic epoxy siloxane resins obtained in the examples and in the comparative example are provided in the following Table 3.

TABLE 3

|  | Weight-Average Molecular Weight | PDI | Epoxy Equivalent (mol/100 g] |
|---|---|---|---|
| Example 13 | 2,382 | 1.09 | 0.52 |
| Example 14 | 2,435 | 1.11 | 0.48 |
| Example 15 | 2,460 | 1.10 | 0.43 |
| Example 16 | 2,469 | 1.11 | 0.38 |
| Comparative Example 2 | 2,379 | 1.11 | 0.33 |

In order to measure the surface hardness of the siloxane cured hard-coating articles obtained in the examples and the comparative example, a pencil hardness tester according to JIS K-5600 was used, and the results are shown in the following Table 4.

TABLE 4

|  | Thickness of Coating Film on PET: 40 μm |
|---|---|
| Example 13 | 9H |
| Example 14 | 9H |
| Example 15 | 8H |
| Example 16 | 7H |
| Comparative Example 2 | 2H |

As can be seen from Table 4, in the Examples 13 to 16 in which the epoxy equivalents are in the range from 0.35 to 0.6 (mol/100 g), siloxane cured hard-coating articles having high hardness equal to or higher than 7H can be obtained, whereas the siloxane cured hard-coating article having the epoxy equivalent smaller than 0.35 (mol/100 g) in the Comparative Example 2 exhibits low level of hardness of 2H. That is, since the siloxane resins in accordance with the present disclosure has epoxy equivalents in the range of from 0.35 to 0.6 (mol/100 g) and molecular weight distributions of PDI in the wide range of from 1.05 to 1.4, siloxane molecules can be densely cross-linked at the time of polymerization, so that it is possible to provide a cured siloxane hard-coating articles having high hardness.

The siloxane hard-coating resin composition in accordance with the present disclosure is also characterized in that a reactive monomer capable of being subjected to photo-polymerization or thermal polymerization is further added in an amount of from 1 to 40 parts by weight with respect to the siloxane resin of 100 parts by weight in order to control the viscosity of the siloxane resin and improve processability. In order to investigate the effect of different amounts of reactive monomer, the following Example was conducted.

Example 17

2-(3,4-epoxycyclohexyl)ethyltrimethoxysilane (ECTMS, Gelest) and water (H$_2$O, Sigma-Aldrich) were mixed at a ratio of 24.64 g:2.70 g (0.1 mol:0.15 mol), and then put into a 100 mL of 2-neck flask. Thereafter, 0.05 mL of ammonia as a catalyst was added to the mixture, and stirred at 60° C. for 6 hours. The mixture was filtered using a 0.45 μm Teflon filter, thereby obtaining an alicyclic epoxy siloxane resin. The molecular weight of the alicyclic epoxy siloxane resin was measured using a Matrix-Assisted Laser Desorption Ionization Mass Spectrometer, and a measured value is shown in the following FIG. 1. By using this measured value, it was confirmed that the alicyclic epoxy siloxane resin has a number average molecular weight of 1,498, a weight-average molecular weight of 1,771, and a PDI ($M_w/M_n$) of 1.18.

Next, 3-ethyl-3[{(3-ethyloxetane-3-yl)methoxy}methyl] oxetane, 3-ethyl-3-hydroxymethyloxetane, 2-ethylhexyloxetane, 4-[(3-ethyloxetane-3-yl)methoxy]butan-1-ol, (3-ethyloxetane-3-yl)methylmethacrylate, (3,4-epoxycyclohexyl)methyl 3,4-epoxycyclohexylcarboxylate were added as photo-polymerizable monomers in amounts of 10, 20, 30, 40 and 50 parts by weight, respectively, with respect to the obtained resin. Further, an aryl sulfonium hexafluoroantimonate salt as a polymerization initiator for photo-polymerization was also added in an amount of 2 parts by weight with respect to the mixed resin. Then, as antioxidants to prevent oxidation due to the polymerization, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin compositions were coated on the surface of PET in a thickness of 40 μm, and then exposed to a UV lamp with a wavelength of 365 nm for 1 minute for photo-curing. After photo-curing was completely finished, thermal treatment was performed at a temperature of 80° C. for 1 hour, so that siloxane cured hard-coating articles were produced.

The weight-average molecular weight and the PDI value of the alicyclic epoxy siloxane resin obtained in the example are provided in the following Table 5.

TABLE 5

| Example No. | Weight-Average Molecular Weight | PDI |
| --- | --- | --- |
| 17 | 1,771 | 1.18 |

In order to measure the surface hardness of the siloxane cured hard-coating articles obtained in the Example 17, a pencil hardness tester according to JIS K-5600 was used, and the results are shown in the following Table 6.

TABLE 6

| | Parts by Weight With Respect To Siloxane Resin | | | | |
| --- | --- | --- | --- | --- | --- |
| | 10 | 20 | 30 | 40 | 50 |
| 3-ethyl-3[{(3-ethyloxetane-3-yl)methoxy}methyl]oxetane | 9H | 9H | 6H | 4H | 2H |
| 3-ethyl-3-hydroxymethyloxetane | 9H | 9H | 7H | 5H | 2H |
| 2-ethylhexyloxetane | 9H | 9H | 6H | 4H | 1H |
| 4-[(3-ethyloxetane-3-yl)methoxy]butan-1-ol | 9H | 9H | 7H | 4H | 2H |
| (3-ethyloxetane-3-yl)methylmethacrylate | 9H | 9H | 7H | 6H | 2H |
| (3,4-epoxycyclohexyl)methyl 3,4-epoxycyclohexylcarboxylate | 9H | 9H | 6H | 5H | 2H |

As can be seen from Table 6, when producing the siloxane hard-coating resin compositions, if the reactive monomer was added in an amount equal to or more than 40 parts by weight with respect to the siloxane resin of about 100 parts by weight, it was found out that the cured hard-coating articles exhibited low levels of hardness equal to or less than 2H, showing sharply deteriorated characteristic. Thus, when producing a siloxane hard-coating resin composition in accordance with the present disclosure, it may be to add the reactive monomer in an amount of from 1 to 40 parts by weight with respect to the siloxane resin of 100 parts by weight.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A hard-coating resin composition consisting essentially of a siloxane resin including an alicyclic epoxy group, wherein the siloxane resin has a weight-average molecular weight in the range of from 1,000 to 4,000 and a molecular weight distribution of PDI ranging from 1.05 to 1.4,
   wherein an epoxy equivalent of the siloxane resin is in the range of from 0.35 to 0.6 mol/100 g, and
   wherein the siloxane resin is prepared, in the presence of water and a catalyst, by hydrolysis and condensation of (i) an alkoxysilane alone represented by the following Chemical Formula 1 including an alicyclic epoxy group and an alkoxy group, or (ii) an alkoxysilane represented by the following Chemical Formula 1 including an alicyclic epoxy group and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein,
$R^1$ is a straight or branched $C_1$ to $C_6$ alkyl group including an alicyclic epoxy group, the alicyclic epoxy group is a $C_3$ to $C_6$ cycloalkyl group having an epoxy group,
$R^2$ is a straight or branched $C_1$ to $C_7$ alkyl group, and
n is an integer of from 1 to 3.

2. The hard-coating resin composition of claim 1, wherein the alkoxysilane represented by Chemical Formula 1 is 2-(3,4-epoxycyclohexyl)ethyltrimethoxysilane, or 2-(3,4-epoxycyclohexyl)ethyltriethoxysilane.

3. The hard-coating resin composition of claim 1, wherein the catalyst is one selected from the group consisting of hydrochloric acid, acetic acid, hydrogen fluoride, nitric acid, sulfuric acid, chlorosulfonic acid, iodic acid, pyrophosphoric acid, ammonia, potassium hydroxide, sodium hydroxide, barium hydroxide, imidazole; an ion exchange resin; and combinations thereof.

4. A preparing method of a cured hard-coating article, comprising a polymerization of the hard-coating resin composition of claim 1.

5. The preparing method of a cured hard-coating article of claim 4, wherein the polymerization includes irradiating light or heating.

6. An optical film or sheet comprising a cured hard-coating article which is prepared by the preparing method as claim 4.

7. A hard-coating resin composition consisting essentially of a siloxane resin including an alicyclic epoxy group, and a monomer having or having an alicyclic epoxy group, in an amount of from 1 to 40 parts by weight with respect to the siloxane resin of 100 parts by weight,
wherein the siloxane resin has a weight-average molecular weight in the range of from 1,000 to 4,000 and a molecular weight distribution of PDI ranging from 1.05 to 1.4,
wherein an epoxy equivalent of the siloxane resin is in the range of from 0.35 to 0.6 mol/100 g, and
wherein the siloxane resin is prepared, in the presence of water and a catalyst, by hydrolysis and condensation of
(i) an alkoxysilane alone represented by the following Chemical Formula 1 including an alicyclic epoxy group and an alkoxy group, or (ii) an alkoxysilane represented by the following Chemical Formula 1 including an alicyclic epoxy group and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein,
$R^1$ is a straight or branched $C_1$ to $C_6$ alkyl group including an alicyclic epoxy group, the alicyclic epoxy group is a $C_3$ to $C_6$ cycloalkyl group having an epoxy group,
$R^2$ is a straight or branched $C_1$ to $C_7$ alkyl group, and
n is an integer of from 1 to 3.

8. The hard-coating resin composition of claim 7,
wherein the monomer having the alicyclic epoxy group is one or more selected from the group consisting of 4-vinylcyclohexene dioxide, 4-vinylcyclohexene oxide, (3,4-epoxycyclohexyl)methyl 3,4-epoxycyclohexylcarboxylate, 3,4-epoxycyclohexylmethyl methacrylate, bis(3,4-epoxycyclohexylmethyl) adipate, 3,4-epoxycyclohexancarboxylate, and 2-(3,4-epoxycyclohexyl)-1,3-dioxolane.

9. A hard-coating resin composition consisting essentially of a siloxane resin including an alicyclic epoxy group, and a polymerization initiator selected from the group consisting of an onium salt, an organometallic salt, an amine, and an imidazole in an amount of from 0.1 to 10 parts by weight with respect to the siloxane resin of 100 parts by weight,
wherein the siloxane resin has a weight-average molecular weight in the range of from 1,000 to 4,000 and a molecular weight distribution of PDI ranging from 1.05 to 1.4,
wherein an epoxy equivalent of the siloxane resin is in the range of from 0.35 to 0.6 mol/100 g, and
wherein the siloxane resin is prepared, in the presence of water and a catalyst, by hydrolysis and condensation of
(i) an alkoxysilane alone represented by the following Chemical Formula 1 including an alicyclic epoxy group and an alkoxy group, or (ii) an alkoxysilane represented by the following Chemical Formula 1 including an alicyclic epoxy group and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein, $R^1$ is a straight or branched $C_1$ to $C_6$ alkyl group including an alicyclic epoxy group, the alicyclic epoxy group is a $C_3$ to $C_6$ cycloalkyl group having an epoxy group, $R^2$ is a straight or branched $C_1$ to $C_7$ alkyl group, and n is an integer of from 1 to 3.

10. A hard-coating resin composition consisting essentially of a siloxane resin including an alicyclic epoxy group, and one or more additives selected from the group consisting of an organic solvent, an antioxidant, a leveling agent, and a flow control agent, wherein the siloxane resin has a weight-average molecular weight in the range of from 1,000 to 4,000 and a molecular weight distribution of PDI ranging from 1.05 to 1.4, wherein an epoxy equivalent of the siloxane resin is in the range of from 0.35 to 0.6 mol/100 g, and wherein the siloxane resin is prepared, in the presence of water and a catalyst, by hydrolysis and condensation of (i) an alkoxysilane alone represented by the following Chemical Formula 1 including an alicyclic epoxy group and an alkoxy group, or (ii) an alkoxysilane represented by the following Chemical Formula 1 including an alicyclic epoxy group and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein, $R^1$ is a straight or branched $C_1$ to $C_6$ alkyl group including an alicyclic epoxy group, the alicyclic epoxy group is a $C_3$ to $C_6$ cycloalkyl group having an epoxy group, $R^2$ is a straight or branched $C_1$ to $C_7$ alkyl group, and n is an integer of from 1 to 3.

* * * * *